United States Patent
Kim et al.

(10) Patent No.: US 10,840,561 B2
(45) Date of Patent: Nov. 17, 2020

(54) BATTERY PACK

(71) Applicant: SAMSUNG SDI CO., LTD., Yongin-si (KR)

(72) Inventors: Jaemin Kim, Yongin-si (KR); Daeyon Moon, Yongin-si (KR); Byungkook Ahn, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 727 days.

(21) Appl. No.: 15/142,420

(22) Filed: Apr. 29, 2016

(65) Prior Publication Data

US 2016/0351971 A1    Dec. 1, 2016

(30) Foreign Application Priority Data

May 28, 2015    (KR) ........................ 10-2015-0075364

(51) Int. Cl.
  *H01M 10/00*    (2006.01)
  *H01M 10/42*    (2006.01)
  *H01M 2/10*    (2006.01)
  *H01M 10/04*    (2006.01)

(52) U.S. Cl.
  CPC ....... *H01M 10/425* (2013.01); *H01M 2/1077* (2013.01); *H01M 10/0436* (2013.01)

(58) Field of Classification Search
  CPC .............. H01M 10/425; H01M 2/1077; H01M 10/0436
  See application file for complete search history.

(56) References Cited

U.S. PATENT DOCUMENTS

| | | | |
|---|---|---|---|
| 6,524,732 B1 * | 2/2003 | Iwaizono | H01M 10/42 429/100 |
| 2012/0214024 A1 | 8/2012 | Moon et al. | |
| 2012/0214025 A1 * | 8/2012 | Moon | H01M 2/1061 429/7 |
| 2012/0257349 A1 | 10/2012 | Bang et al. | |
| 2013/0224524 A1 * | 8/2013 | Nam | H01M 2/1077 429/7 |

FOREIGN PATENT DOCUMENTS

| | | |
|---|---|---|
| JP | 2013-218899 A | 10/2013 |
| KR | 10-2011-0072241 A | 6/2011 |
| KR | 10-2012-0094706 A | 8/2012 |

* cited by examiner

*Primary Examiner* — Nicholas P D'Aniello
(74) *Attorney, Agent, or Firm* — Lee IP Law, P.C.

(57) ABSTRACT

A battery pack, including a battery cell; and a case having a receiving space for the battery cell, the case including a frame member including an opening formed in a central portion thereof and having an inner surface facing the receiving space and an outer surface opposite the inner surface; a first cover on the frame member, the first cover including a flange portion supported on the inner surface of the frame member, a main body exposed through the opening of the frame member, and a connecting portion connecting the flange portion to the main body in a stepped manner; and a second cover coupled to the frame member, the battery cell being between the second cover and the frame member.

21 Claims, 8 Drawing Sheets

BATTERY PACK

CROSS-REFERENCE TO RELATED APPLICATION

Korean Patent Application No. 10-2015-0075364, filed on May 28, 2015, in the Korean Intellectual Property Office, and entitled: "Battery Pack," is incorporated by reference herein in its entirety.

BACKGROUND

1. Field

One or more exemplary embodiments relate to a battery pack.

2. Description of the Related Art

Unlike primary batteries that may not be rechargeable, secondary batteries may be charged and discharged. Secondary batteries may be used as energy sources of, for example, mobile devices, electric automobiles, hybrid automobiles, electric bicycles, and uninterruptible power supplies. Depending on the types of external devices to which secondary batteries may be applied, the secondary batteries may be used as single battery cells battery packs in which a plurality of battery cells may be connected into one unit.

Small mobile devices such as mobile phones may operate for a predetermined time by using an output and a capacity of a single battery. In the case of electric automobiles or hybrid automobiles which may have large power consumption, a long driving time, and high-power driving, battery packs may be preferred due to, for example, the power and capacity requirement. An output voltage or an output current of a battery pack may increase as the number of battery cells that may be included in the battery pack increases.

SUMMARY

Embodiments may be realized by providing a battery pack, including a battery cell; and a case having a receiving space for the battery cell, the case including a frame member including an opening formed in a central portion thereof and having an inner surface facing the receiving space and an outer surface opposite the inner surface; a first cover on the frame member, the first cover including a flange portion supported on the inner surface of the frame member, a main body exposed through the opening of the frame member, and a connecting portion connecting the flange portion to the main body in a stepped manner; and a second cover coupled to the frame member, the battery cell being between the second cover and the frame member.

The flange portion and the main body may extend in parallel, and the connecting portion may form an acute angle with respect to an extension direction of the flange portion and the main body and may gently connect the flange portion to the main body.

A first boundary between the connecting portion and the flange portion may be round.

A second boundary between the connecting portion and the main body may be round.

The battery pack may further include an adhesive member between the frame member and the first cover.

Each of the first and second covers may include a metal material.

The battery pack may further include an insulating member between the battery cell and the first and second covers.

The first and second covers may be coupled to a same frame member.

The frame member may include a cell region supporting the battery cell and a circuit region supporting a protection circuit controlling a charging/discharging operation of the battery cell, and the first and second covers may selectively cover the cell region.

The battery pack may further include a third cover selectively covering the circuit region.

The frame member may include a rib dividing the cell region into cell regions, two or more first covers may respectively cover the cell regions, and the second cover may entirely cover all of the cell regions.

The second cover may include a coupling portion protruding from the main body toward the frame member.

The coupling portion of the second cover and the frame member may be hooked to each other.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of" when preceding a list of elements, modify the entire list of elements and do not modify the individual elements of the list.

Figure 1:
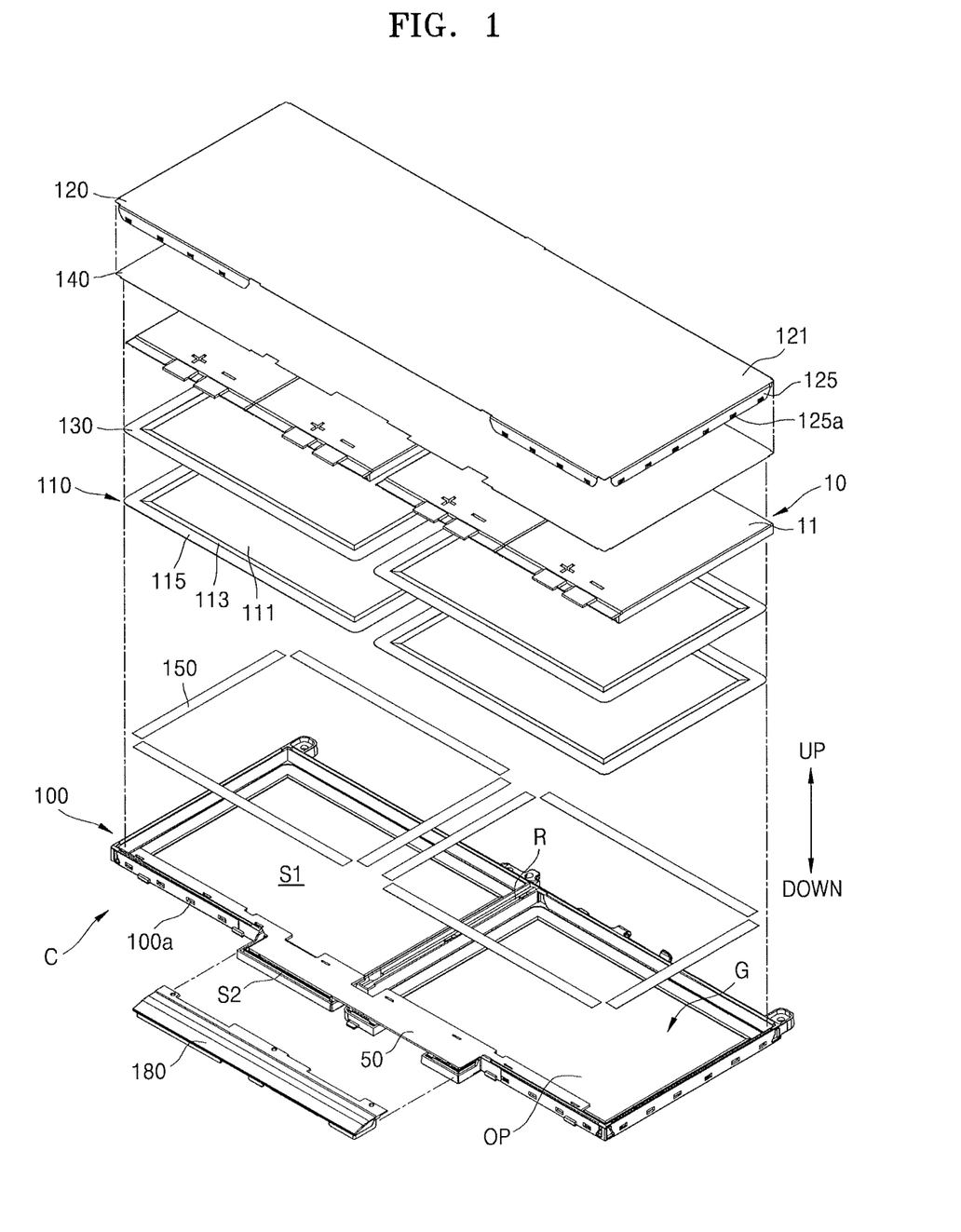
FIG. 1 illustrates an exploded perspective view of a battery pack according to an exemplary embodiment.
Figure 2:
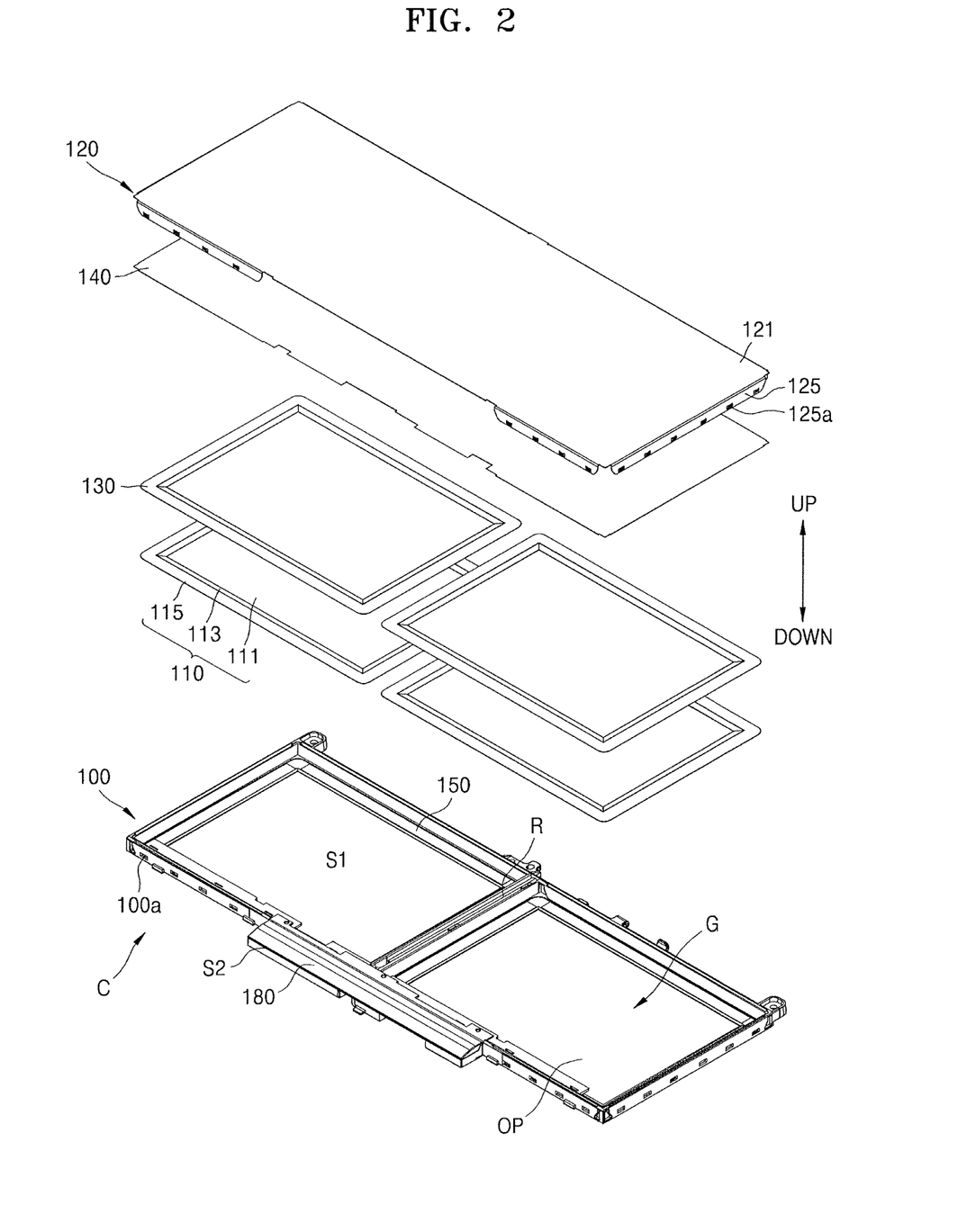
FIG. 2 illustrates an exploded perspective view of a case of FIG. 1.

FIG. 1 illustrates an exploded perspective view of a battery pack according to an exemplary embodiment. FIG. 2 illustrates an exploded perspective view of a case C of FIG. 1.

Referring to FIGS. 1 and 2, the battery pack may include a battery cell 10 and the case C that has a receiving space G in which the battery cell 10 is disposed.

The battery cell 10 may include a jelly roll-type electrode assembly in which a positive electrode plate and a negative electrode plate having different polarities and a separator that is disposed between the positive electrode and the negative electrode are wound together, or a stack-type electrode assembly in which a separator is stacked between a positive electrode plate and a negative electrode plate having different polarities. For example, the battery cell 10 may include an electrode assembly and an outer member 11 in which an electrolyte may be contained. For example, the battery cell 10 may include the outer member 11 that is a soft pouch-type case. However, the present exemplary embodiment is not limited thereto.

The battery pack according to the present exemplary embodiment may include a plurality of the battery cells 10 that are electrically connected to one another. For example, the plurality of battery cells 10 may be electrically connected in series, parallel, or series-parallel and thus may provide a high output that is demanded. The plurality of battery cells 10 may be received in the case C and may be formed into one pack. As will be explained below, a protection circuit 50 may control a charging/discharging operation of the plurality of battery cells 10. For example, the protection circuit 50 may collect pieces of state information such as temperature or voltage information from the plurality of battery cells 10 and may perform a protection operation, e.g., an operation of stopping the charging/discharging operation, when the plurality of battery cells 10 abnormally operate, e.g., when the plurality of battery cells 10 are over-charged or over-discharged. For example, the plurality of battery cells 10 may be electrically connected to one another through the protection circuit 50.

The case C that has the receiving space G in which the battery cell 10 is disposed may include a plurality of elements that may be assembled to face each other with the battery cell 10 therebetween. For example, the case C may include a frame member 100 that may have an opening OP formed in a central portion of the frame member 100, and first and second covers 110 and 120 that may be assembled in the frame member 100.

The frame member 100 in the central portion of which the opening OP is formed may be formed as a frame of the battery pack. The frame member 100 may have an inner surface that faces the receiving space G, e.g., and is parallel with the receiving space G, and an outer surface that is opposite to the inner surface.

The first and second covers 110 and 120 may be coupled to the frame member 100. For example, the first and second covers 110 and 120 may be coupled to the frame member 100 in the same assembly direction from above to the frame member 100. The first and second covers 110 and 120 may be coupled to the inner surface of the frame member 100.

The first cover 110 may be assembled on the inner surface of the frame member 100, and may include a flange portion 115 that may be supported on the frame member 100 and a main body 111 that may be exposed through the opening OP of the frame member 100. For example, the first cover 110 may include the main body 111 that occupies a relatively large area and the flange portion 115 that is formed on an edge of the main body 111 and is supported on the frame member 100. For example, the flange portion 115 may be formed along the edge of the main body 111, and may be formed to surround the main body 111 along the edge of the main body 111. The main body 111 may be formed at the center of the first cover 110, and may be formed to occupy the majority of a surface of the first cover 110. For example, the main body 111 may be formed to have a flat plate shape.

The main body 111 and the flange portion 115 may be formed to be stepped in a thickness direction of the first cover 110. For example, a connecting portion 113 that may connect the main body 111 to the flange portion 115 in a stepped manner may be formed between the main body 111 and the flange portion 115. The connecting portion 113 may align the main body 111 with the opening OP by forming a stepped portion between the main body 111 and the flange portion 115. The connecting portion 113 may function as a position aligning unit for aligning the first cover 110 with the frame member 100. For example, as the main body 111 that may protrude relative to the flange portion 115 is inserted into the opening OP of the frame member 100, the first cover 110 and the frame member 100 may be aligned with each other. The frame member 100 and the first cover 110 may be aligned with each other due to, for example, the main body 111 that is inserted into the opening OP of the frame member 100, and wrong assembly between the frame member 100 and the first cover 110 may be prevented.

Figure 3:
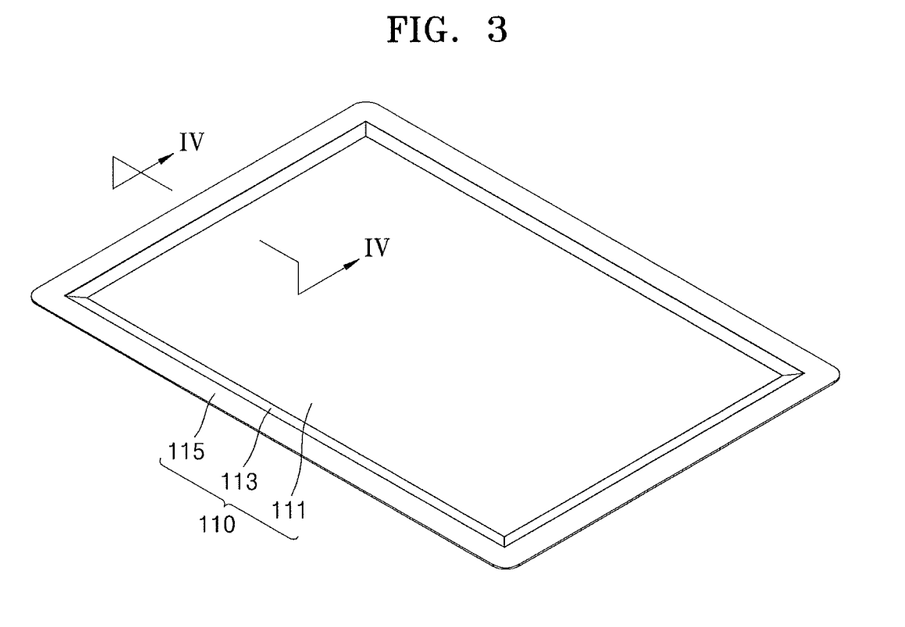
FIG. 3 illustrates a perspective view of a first cover.
Figure 4:
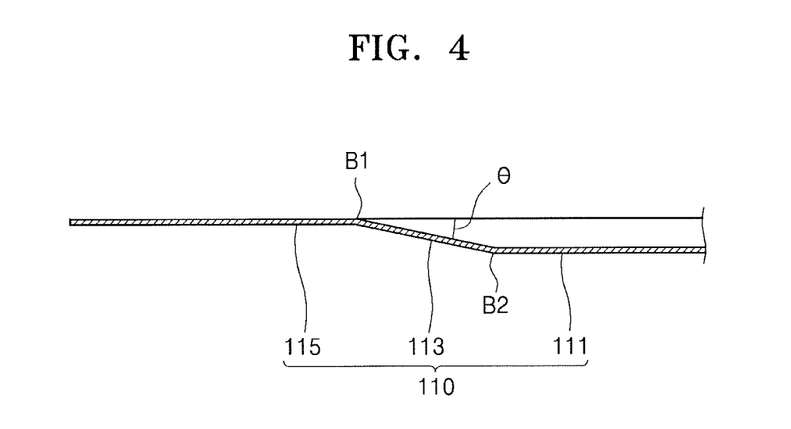
FIG. 4 illustrates a cross-sectional view taken along line IV-IV of FIG. 3.

FIG. 3 illustrates a perspective view of the first cover 110. FIG. 4 illustrates a cross-sectional view taken along line IV-IV of FIG. 3.

Referring to FIGS. 3 and 4, the connecting portion 113 that may connect the main body 111 to the flange portion 115 in a stepped manner may be formed between the flange portion 115 and the main body 111 of the first cover 110. The connecting portion 113 may obliquely extend between the main body 111 and the flange portion 115. The connecting portion 113 may extend in an inclination angle θ between the main body 111 and the flange portion 115. The inclination angle θ may be set to an acute angle. For example, the main body 111 and the flange portion 115 may extend in parallel. The inclination angle θ of the connecting portion 113 may be set to an acute angle with respect to an extension direction in which the main body 111 and the flange portion 115 extend. When the inclination angle θ is an acute angle with respect to the extension direction of the main body 111 and the flange portion 115, the connecting portion 113 may gently, e.g., gradually, extend between the main body 111 and the flange portion 115. For example, the connecting portion 113 may extend to gently form an acute angle with respect to the extension direction of the main body 111 and the flange portion 115, without being sharply bent to be perpendicular to the extension direction or without being sharply inclined to form an obtuse angle, and may gently, e.g., gradually, connect the main body 111 to the flange portion 115.

For example, while extending from the flange portion 115 toward the main body 111, the connecting portion 113 may gently and obliquely extend to form an acute angle from the flange portion 115, without being sharply bent to form a right angle or an obtuse angle. Since the connecting portion 113 may gently connect the flange portion 115 to the main body 111, a stress concentration on the first cover 110 may be prevented and a locally concentrated load on the battery cell 10 that is supported on the first cover 110 may be prevented, which will be explained below in detail.

Figure 5:
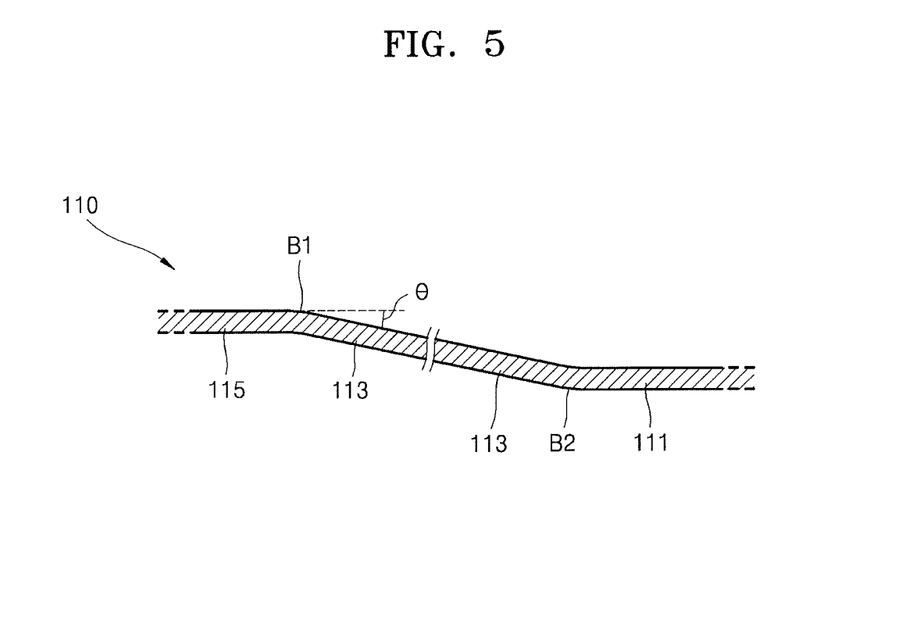
FIG. 5 illustrates a partial enlarged view of FIG. 4.

FIG. 5 illustrates a partial enlarged view of FIG. 4.

Referring to FIG. 5, the connecting portion 113 may almost linearly extend in the inclination angle θ. Boundaries of the connecting portion 113, for example, a first boundary B1 between the connecting portion 113 and the flange portion 115 and a second boundary B2 between the connecting portion 113 and the main body 111, may be formed to be round. For example, the first and second boundaries B1 and B2 may roundly and gently connect the flange portion 115 and the main body 111 that may horizontally extend to the connecting portion 113 that may obliquely extend. A stress concentration on the first cover 110 may be prevented and a locally concentrated load on the battery cell 10 that is supported on the first cover 110 may be prevented, due to, for example, the first and second boundaries B1 and B2 that are round.

Figure 6:
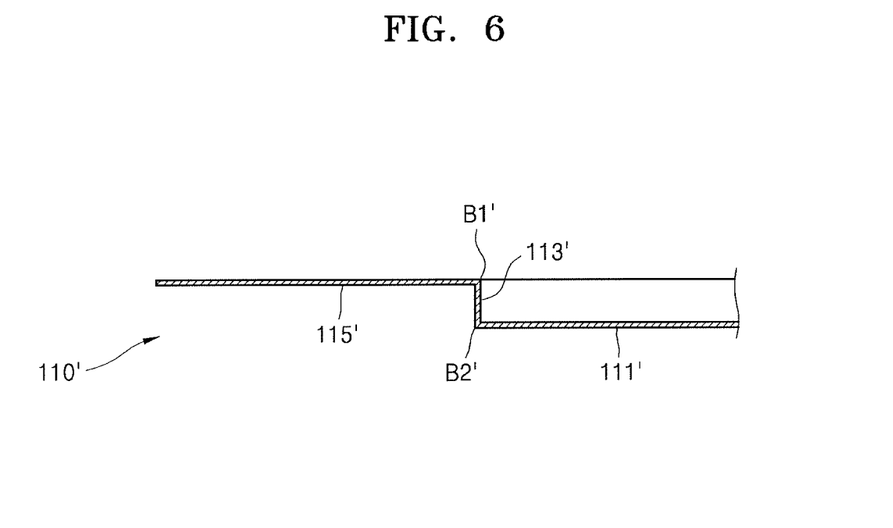
FIG. 6 illustrates a cross-sectional view of a structure of a first cover according to a comparative example.

FIG. 6 illustrates a cross-sectional view of a structure of a first cover 110' according to a comparative example.

In the comparative example, a connecting portion 113' that connects a flange portion 115' of the first cover 110' to a main body 111' in a stepped manner is sharply bent to be perpendicular to an extension direction in which the flange portion 115' and the main body 111' extend, and a first boundary B1' between the connecting portion 113' and the flange portion 115' and a second boundary B2' between the connecting portion 113' and the main body 111' are formed to be angular. The connecting portion 113' that perpendicularly extends and the first and second boundaries B1' and B2' that are angular may cause a stress concentration on the first cover 110', and the first cover 110' may be deformed due to, for example, an external load or a vibration. In particular, an angular portion of the first cover 110', for example, the first boundary B1' that is angular, may cause a locally concentrated load on a battery cell that is supported on the first cover 110', thereby damaging the battery cell and denting the battery cell during an assembly process.

In FIG. 4, the connecting portion 113 that connects the flange portion 115 and the main body 111 in a stepped manner may gently connect the flange portion 115 and the main body 111 to form an acute angle with respect to the extension direction of the flange portion 115 and the main body 111, and the first boundary B1 between the connecting portion 113 and the flange portion 115 and the second boundary B2 between the connecting portion 113 and the main body 111 may be formed to be round, and a stress concentration on the first cover 110 may be prevented and a locally concentrated load on the battery cell 10 that is supported on the first cover 110 may be prevented.

Figure 7:
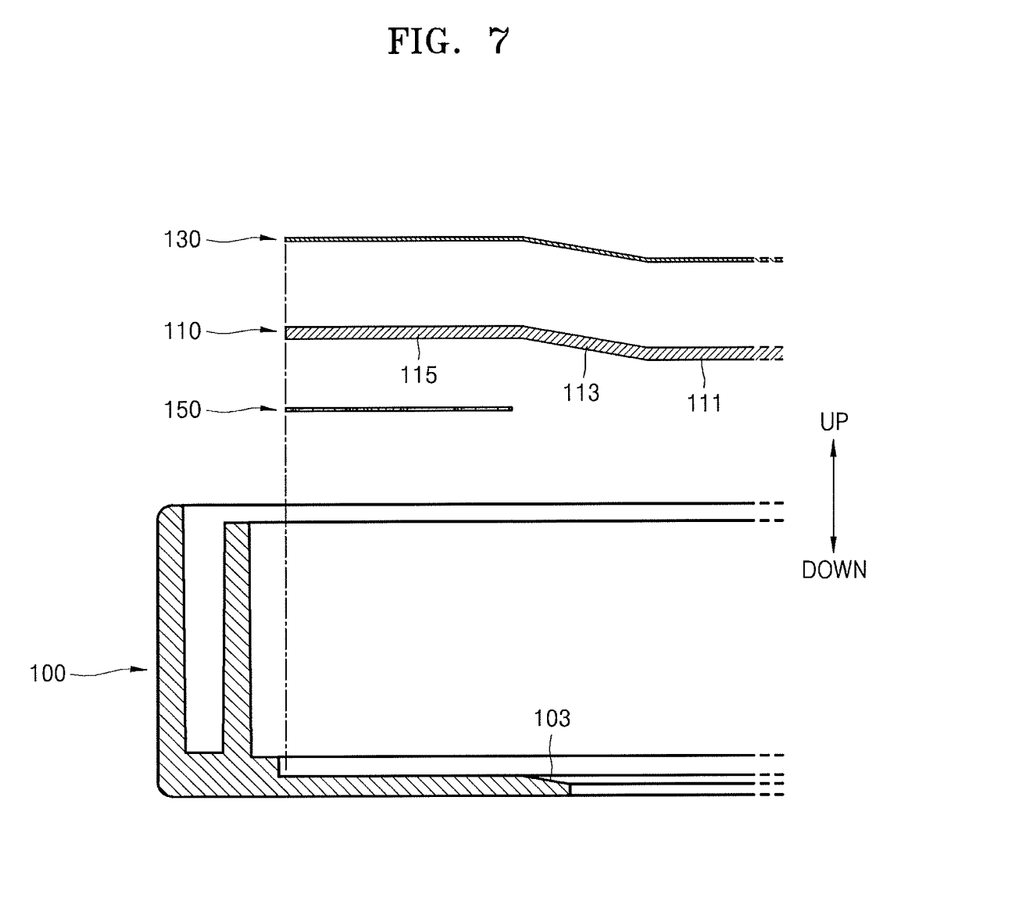
FIG. 7 illustrates a cross-sectional view of an assembly structure of the first cover.

FIG. 7 illustrates a cross-sectional view of an assembly structure of the first cover 110.

Referring to FIG. 7, the connecting portion 113 of the first cover 110 may be supported on an inclined portion 103 of the frame member 100.

Referring to FIG. 1, the first cover 110 may be assembled on the inner surface of the frame member 100, the flange portion 115 of the first cover 110 may be supported on the inner surface of the frame member 100, and the main body 111 of the first cover 110 may be exposed to the outside of the frame member 100 through the opening OP of the frame member 100. An adhesive member 150 may be disposed between the frame member 100 and the flange portion 115, and the first cover 110 may be attached to the frame member 100 by using the adhesive member 150. For example, a double-side tape may be used as the adhesive member 150.

The battery cell 10 may be supported on the first cover 110. An insulating member 130 may be disposed between the first cover 110 and the battery cell 10. The insulating member 130 may block electrical interference between the first cover 110 and the battery cell 10. As will be explained below, the first cover 110 may be formed of a metal material such as steel use stainless (SUS). The insulating member 130 may be disposed between the battery cell 10 and the first cover 110 formed of a metal to electrically insulate the battery cell 10 from the first cover 110. For example, the insulating member 130 may be entirely disposed between the first cover 110 and the battery cell 10. For example, the insulating member 130 may be entirely attached to an inner surface of the first cover 110, for example, a surface of the first cover 110 facing the battery cell 10. For example, the insulating member 130 may be attached to the inner surface of the first cover 110 to conform to the first cover 110.

The frame member 100 may include a cell region S1 on which the battery cell 10 may be supported, and a circuit region S2 on which the protection circuit 50 for controlling a charging/discharging operation of the battery cell 10 may be supported. For example, at least a part of the protection circuit 150 may be supported on the circuit region S2 and the battery cell 10 may not be supported on the circuit region S2. The first cover 110 may be formed to cover the cell region S1. The circuit region S2 may be covered by a third cover 130 that may be a separate member.

The cell region S1 may be divided into two regions. For example, a rib R for laterally dividing the cell region S1 into two cell regions S1 may be included in the frame member 100. The first cover 110 may be provided for each of the cell regions S1. One first cover 110 may cover only one cell region S1 without covering all of the cell regions S1, a size of the first cover 110 may be reduced, the flatness of the first cover 110 may be easily maintained, and the first cover 110 and the frame member 100 may be easily assembled. The first cover 110 may have a substantially flat plate shape, and the first cover 110 may have a low stiffness. Accordingly, the flatness of the first cover 110 may be maintained and deformation may be suppressed by reducing a size of the first cover 110.

The battery cell 10 may be disposed between the first cover 110 and the second cover 120 that may be assembled on the frame member 100, and the frame member 100 and the second cover 120 may be coupled to each other. For example, the second cover 120 may be assembled on the frame member 100 with the battery cell 10 therebetween.

Figure 8:
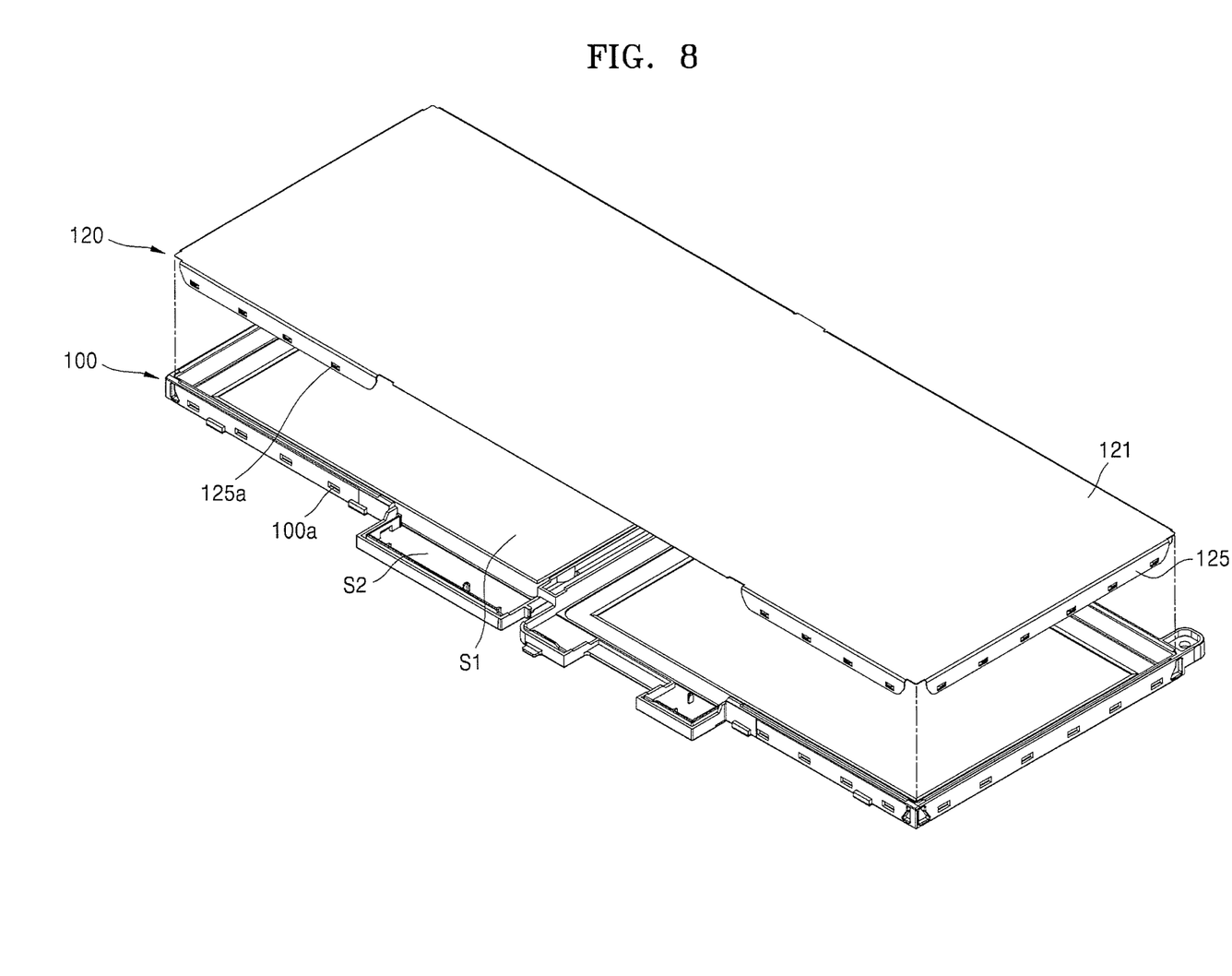
FIG. 8 illustrates an exploded perspective view of an assembly structure of a second cover.

FIG. 8 illustrates an exploded perspective view of an assembly structure of the second cover 120.

Referring to FIG. 8, the second cover 120 may include a main body 121 that may have a flat panel shape, and a coupling portion 125 that may protrude from the main body 121 and may be coupled to the frame member 100. For example, the coupling portion 125 may protrude from the main body 121 toward the frame member 100. The coupling portion 125 may be formed on an edge of the main body 121 and may be coupled to the frame member 100. For example, the coupling portion 125 and the frame member 100 may be hooked to each other. For example, hooks 125a and coupling holes 100a may be respectively formed on and in the coupling portion 125 and the frame member 100. For example, the second cover 120 may be coupled to the frame member 100 such that the coupling portion 125 is inserted into the inner surface of the frame member 100, and the second cover 120 may be completely assembled when the hooks 125a of the coupling portion 125 are inserted into the coupling holes 100a of the frame member 100.

The second cover 120 may be formed to cover all of the cell regions S1, unlike the first cover 110. For example, the second cover 120 may include the coupling portion 125 that may protrude from the main body 121 toward the frame member 100, and the stiffness of the second cover 120 may be increased due to, for example, the coupling portion 125. Even when the second cover 120 having the increased stiffness is formed to have a relatively large size in order to cover all of the cell regions S1, the flatness of the second cover 120 may be maintained.

Referring to FIG. 1, the first and second covers 110 and 120 may be assembled on the inner surface of the frame member 100. For example, the first and second covers 110 and 120 may be assembled in the same direction from above to the frame member 100. The first cover 110 may be assembled on the frame member 100, the second cover 120 may be assembled on the first cover 110 with the battery cell 10 therebetween, and then the second cover 120 may be coupled to the frame member 100.

The first and second covers 110 and 120 may be formed to cover the cell region S1 of the frame member 100. The frame member 100 may include the circuit region S2 as well as the cell region S1, and the circuit region S2 may be covered by the third cover 180 different from the first and second covers 110 and 120.

Each of the first and second covers 110 and 120 may be formed of a metal material. In an embodiment, the first and second covers 110 and 120 may be formed of the same metal material, for example, SUS. The insulating members 130 and 140 may be disposed between the battery cell 10 and the first and second covers 110 and 120 each formed of a metal material. The insulating members 130 and 140 may electrically insulate the battery cell 10 from the first and second covers 110 and 120. For example, the insulating members 130 and 140 may be closely attached to inner surfaces of the first and second covers 110 and 120, for example, surfaces of the first and second covers 110 and 120 facing the battery cell 10, and may be assembled while being closely attached to the inner surfaces of the first and second covers 110 and 120.

In an exemplary embodiment, assembly structures of the first and second covers 110 and 120 that are disposed on both sides of the battery cell 10 may be different from each other. In an exemplary embodiment, assembly structures of the first and second covers 110 and 120 may be the same. For example, the first and second covers 110 and 120 may not be assembled on the same frame member 100. For example, the first cover 110 and the second cover 120 may be assembled on different frame members 100, the battery cell 10 may be disposed between the first and second covers 110 and 120, and the different frame members 100 may be coupled to each other.

In an exemplary embodiment, the first and second covers 110 and 120 may be assembled on the frame member 100 in the same direction. For example, the first and second covers 110 and 120 may have the same assembly direction from above to the frame member 100.

Figure 9:
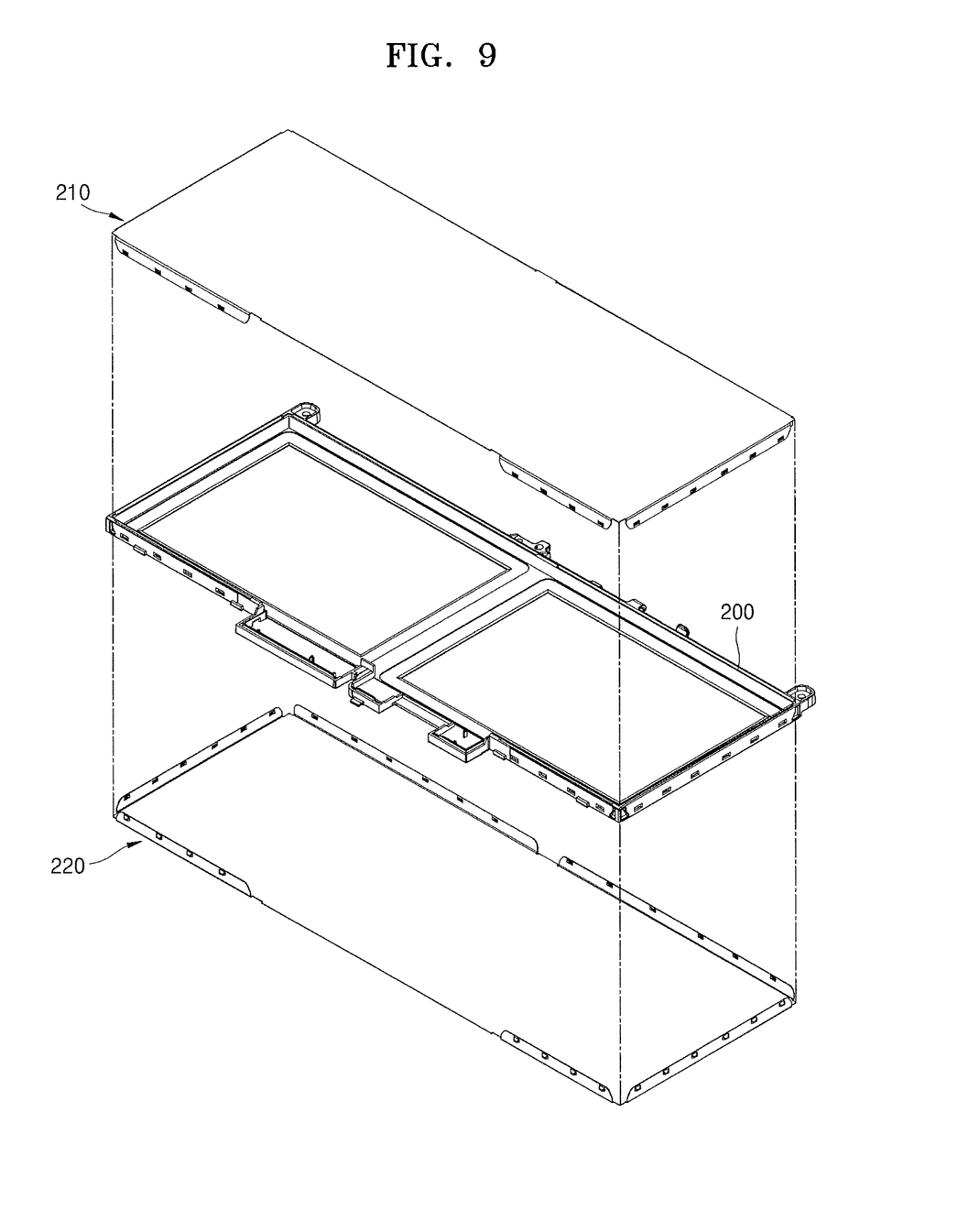
FIG. 9 illustrates an exploded perspective view of some elements of a battery pack according to a comparative example.

FIG. 9 illustrates an exploded perspective view of some elements of a battery pack according to a comparative example. Referring to FIG. 9, in the comparative example, first and second covers 210 and 220 have assembly directions that face each other in a vertical direction of a frame member 200. According to the comparative example, coupling structures between the first and second covers 210 and 220 and the frame member 200 may interfere with each other or may be complex. In an exemplary embodiment, the first and second covers 210 and 220 may be coupled to an inner surface of the frame member 200.

Figure 10:
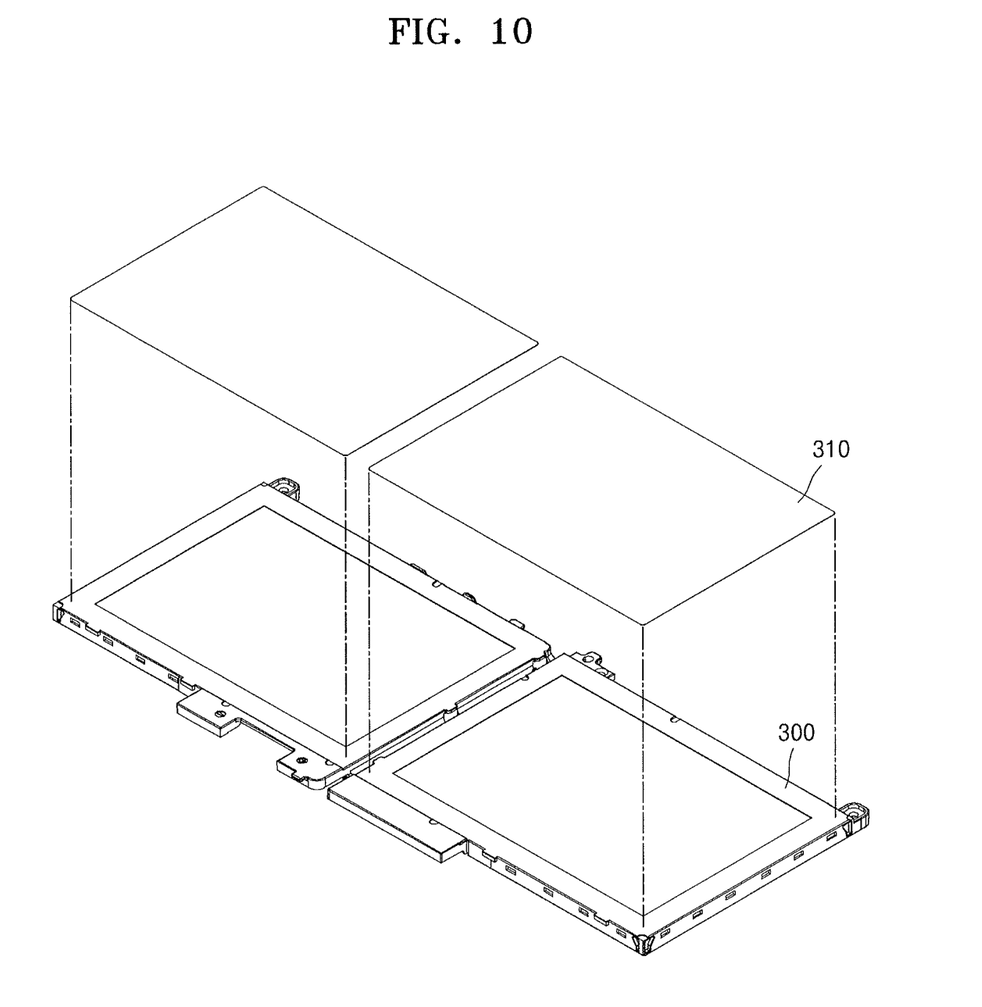
FIG. 10 illustrates an exploded perspective view of some elements of a battery pack according to another comparative example.

FIG. 10 illustrates an exploded perspective view of some elements of a battery pack according to another comparative example. Referring to FIG. 10, in the comparative example, a cover 310 is coupled to an outer surface of a frame member 300. According to the comparative example, there is a risk that the cover 310 may be separated from the frame member 300 due to, for example, an external load.

Referring to FIG. 1, since the first cover 110 may be attached to the inner surface of the frame member 100 by using the adhesive member 150 and the hooks 125*a* of the second cover 120 may be inserted into the coupling holes 100*a* that may be formed in the inner surface of the frame member 100, there may be minimal or no risk that the first and second covers 110 and 120 may be separated from the frame member 100 due to, for example, an external load.

According to the one or more exemplary embodiments, a battery pack that may have a simple structure, a simple assembly structure and process, and high durability may be provided by improving a structure of a case having a receiving space in which a battery cell may be disposed.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
  a battery cell; and
  a case having a receiving space for the battery cell, the case including:
    a frame member including an opening formed in a central portion thereof and having an inner surface facing the receiving space;
    a first cover on the frame member, the first cover including:
      a flange portion overlapping and supported on the inner surface of the frame member,
      a main body overlapping the opening of the frame member, the main body being between the battery cell and opening of the frame member, and
      a connecting portion connecting the flange portion to the main body in an inclined manner, the connecting portion being inclined from the flange portion toward the opening; and
    a second cover coupled to the frame member, the battery cell being between the second cover and the frame member, wherein
  the inner surface of the frame member includes an inclined surface overlapping and supporting the connecting portion of the first cover, the inclined surface of the inner surface of the frame member being inclined toward the opening of the frame member.

2. The battery pack as claimed in claim 1, wherein:
  the flange portion and the main body extend in parallel, and
  the connecting portion forms an acute angle with respect to an extension direction of the flange portion and the main body and gently connects the flange portion to the main body.

3. The battery pack as claimed in claim 1, wherein a first boundary between the connecting portion and the flange portion is round.

4. The battery pack as claimed in claim 1, wherein a second boundary between the connecting portion and the main body is round.

5. The battery pack as claimed in claim 1, further comprising an adhesive member between the frame member and the first cover.

6. The battery pack as claimed in claim 1, wherein each of the first and second covers includes a metal material.

7. The battery pack as claimed in claim 1, further comprising an insulating member between the battery cell and the first and second covers.

8. The battery pack as claimed in claim 1, wherein the first and second covers are coupled to a same frame member.

9. The battery pack as claimed in claim 1, wherein:
the frame member includes a cell region supporting the battery cell and a circuit region supporting a protection circuit controlling a charging/discharging operation of the battery cell, and
the first and second covers selectively cover the cell region.

10. The battery pack as claimed in claim 9, further comprising a third cover selectively covering the circuit region.

11. The battery pack as claimed in claim 9, wherein:
the frame member includes a rib dividing the cell region into cell regions,
two or more first covers respectively cover the cell regions, and
the second cover entirely covers all of the cell regions.

12. The battery pack as claimed in claim 1, wherein the second cover includes a coupling portion protruding from the main body toward the frame member.

13. The battery pack as claimed in claim 12, wherein the coupling portion of the second cover and the frame member are hooked to each other.

14. The battery pack as claimed in claim 1, wherein the inner surface of the frame member is parallel to the flange portion and in surface contact with the flange portion.

15. The battery pack as claimed in claim 1, wherein the frame member includes:
a sidewall surrounding the opening; and
a projection perpendicular to the sidewall and extending from the sidewall toward a center of the opening, the flange portion of the first cover being on the projection, the main body of the first cover fitting in the opening, and the sidewall of the frame member extending above the first cover and above the battery cell toward the second cover.

16. The battery pack as claimed in claim 15, wherein the first cover completely separates between the battery cell and the opening of the frame member, the first cover and the battery cell being stacked above the projection of the frame member along a direction normal to the first cover.

17. The battery pack as claimed in claim 1, wherein the flange portion of the first cover and the battery cell are stacked on the inner surface of the frame member along a direction normal to the main body of the first cover.

18. The battery pack as claimed in claim 1, wherein the connecting portion overlaps a sidewall of the battery cell.

19. The battery pack as claimed in claim 1, wherein:
the inclined surface of the inner surface of the frame member is adjacent to the opening, and
the connecting portion of the first cover is inclined along the inclined surface of the frame member into the opening of the frame member, the connecting portion contacting the inclined surface of the inner surface of the frame member.

20. The battery pack as claimed in claim 5, wherein the adhesive member is only between the inner surface of the frame member and the flange portion of the first cover.

21. The battery pack as claimed in claim 1, wherein the second cover is coupled to the frame member in a first direction as the first cover is coupled to the frame member in the first direction, the battery cell being between the second cover and the frame member.

* * * * *